Aug. 3, 1937.　　　A. E. LARSEN　　　2,088,797

PORTABLE STOVE

Filed March 17, 1936　　　2 Sheets-Sheet 1

INVENTOR.
ALBERT E. LARSEN
BY
ATTORNEY.

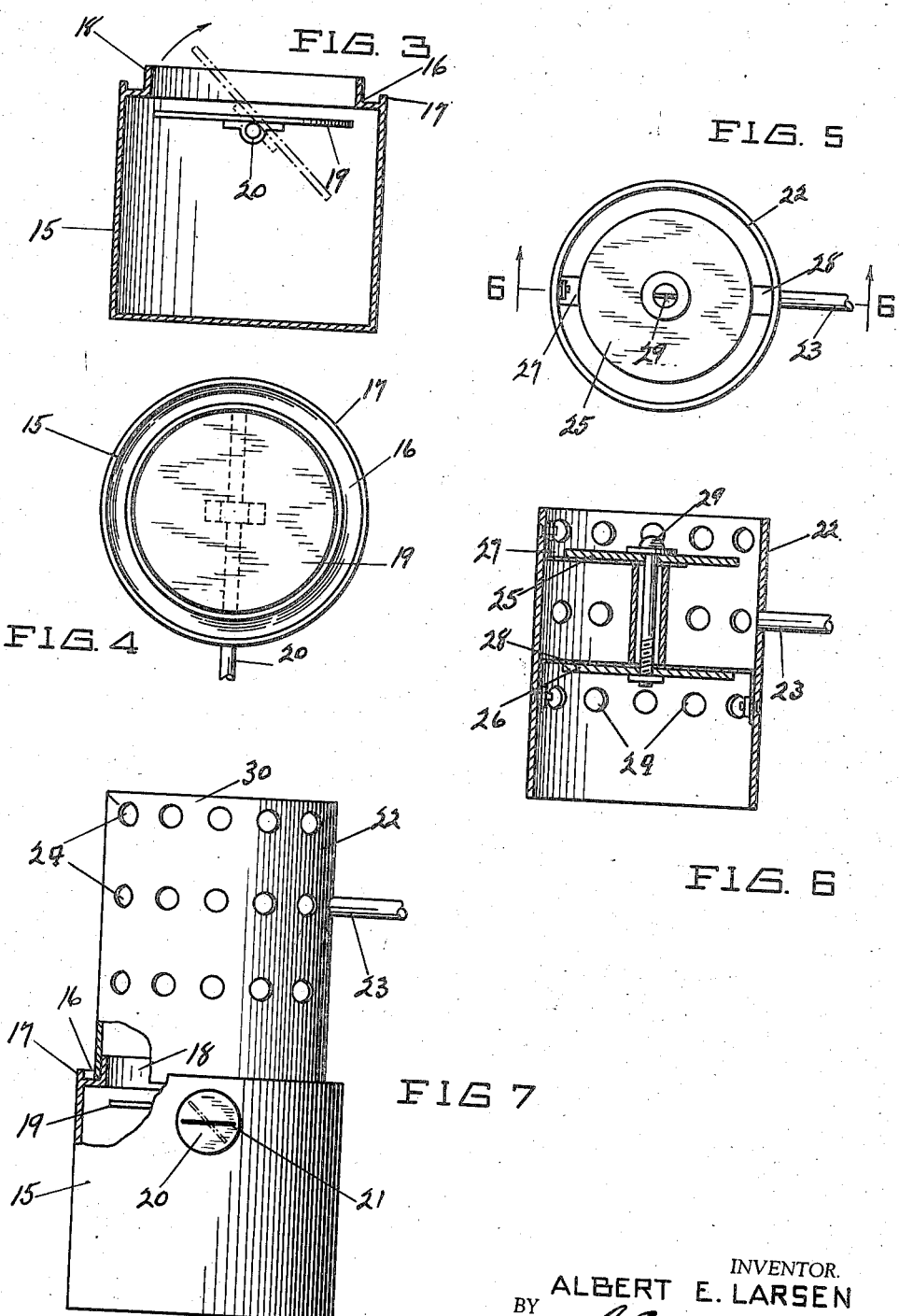

Patented Aug. 3, 1937

2,088,797

UNITED STATES PATENT OFFICE 2,088,797

PORTABLE STOVE

Albert E. Larsen, San Francisco, Calif.

Application March 17, 1936, Serial No. 69,285

3 Claims. (Cl. 126—43)

This invention relates generally to new and useful improvements in portable cookers and has especial reference to an improved portable alcohol cooker that may be easily transported from place to place for the purpose of making light lunches where desired.

I am aware of the fact that portable cookers are at present on the market but these cookers to the best of my knowledge utilize so called Sterno heat or a solid combustible and all of these combustibles more or less smoke and do not produce the proper heat for cooking purposes.

The primary object of my invention is to produce a portable alcohol cooker that produces a hot fire and one that completely burns the fuel without smoking or tarnishing or burning the cooking utensils.

Another object of the invention is to provide a portable cooker of the class indicated that is provided with means for regulating the flame in the cooker.

A further object of the invention is to provide a cooker that may be utilized for general cooking purposes and one that is comparatively simple in construction, is compact, and may be easily transported from place to place such as on camping trips or the like.

Other objects and advantages of the invention will be apparent with reference to the subjoined specification and the accompanying two sheets of drawings in which:—

Figure 3 is a sectional detail of the fuel container per se and including the regulating valve;

Figure 4 is a plan view of the fuel container shown in Figure 3;

Figure 5 is a plan view of the combustion element of the cooker;

Figure 6 is a sectional detail further illustrating the combustion element, the section being taken on the line 6—6 of Figure 5 and Figure 7 is an assembled elevation showing the fuel container and the combustion element in assembled relation.

Figure 1:
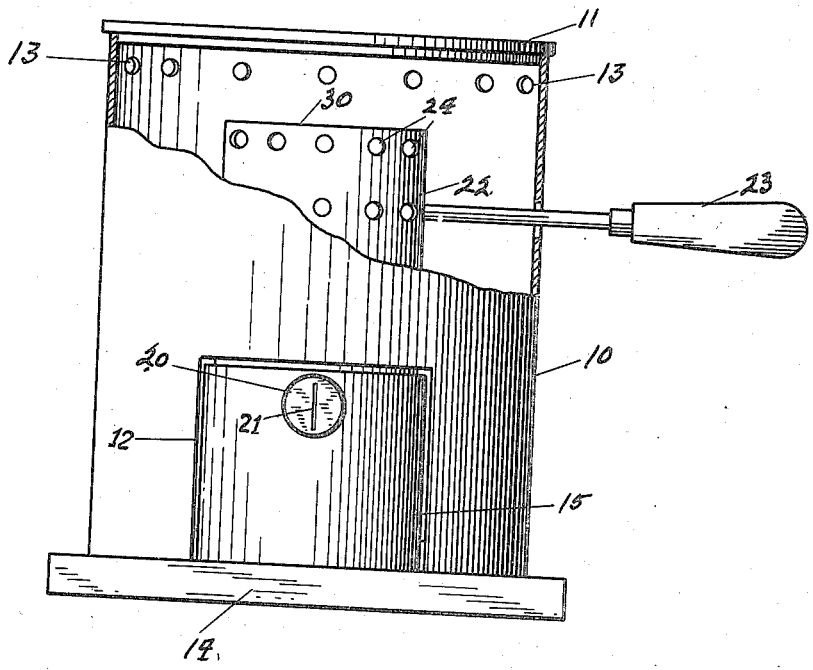
Figure 1 is an elevation partly in section, showing my improved cooker in assembled relation.
Figure 2:
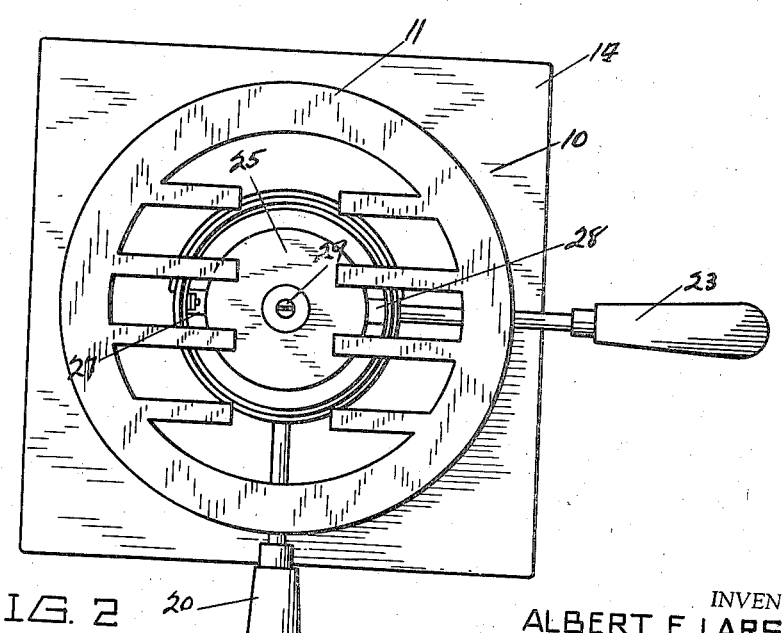
Figure 2 is a top plan view of the cooker showing the several parts in position and a grill covering the top of the cooker.

Referring specifically to the drawings and especially to Figures 1 and 2 thereof the numeral 10 designates the cooker casing proper having a grilled top plate 11, and an opening 12 formed in the side wall of the casing.

The casing 10 is preferably cylindrical and is provided with draft perforations 13 and a suitable base 14, as clearly disclosed in Figures 1 and 2.

The fuel container 15 is shown in place in Figure 1 and in detail in Figures 3, 4 and 7 and comprises a metal alcohol chamber having a shouldered section 16 providing a retaining lip 17 and a neck section 18. The container as thus formed is provided with a butterfly valve 19 turnable by means of the operating handle 20 to regulate the flame as hereinafter more fully set forth.

It will be noted with reference to Figures 1 and 7 that the handle 20 is provided with a marker or notch 21 which indicates the position of the butterfly valve in the fuel container or chamber 15.

The fuel container as described is arranged to seat a combustion element 22, Figures 1 and 7, said combustion element being adapted to seat upon the shouldered section 16 of the fuel container and fitting over the neck section 18 thereof, said combustion element being provided with a removable handle 23 and having a plurality of draft openings 24 perforated in the wall thereof.

Referring now to Figures 5 and 6 it will be observed that the combustion element is provided with spaced baffle plates 25 and 26 held in place by means of clips 27 and 28 respectively, and a centrally disposed bolt 29 so that the draft openings 24 and the baffles provide the necessary air control to produce proper combustion.

The cooker may be quickly assembled and disassembled by removing the handle 23 and disassembling the various parts or the fuel container may be removed from the casing for refilling by raising the combustion element 22 and removing said fuel container thru the casing opening 12, as disclosed in Figure 1.

It will be obvious from the foregoing description that combustion takes place at the top or open upper end of the combustion element and that the volatilized alcohol is regulated by means of the butterfly valve 19 in the fuel container.

In this manner a hot clean flame is secured and the alcohol fuel utilized for combustion purposes is a comparatively cheap fuel and the container when filled will last a considerable period and provides a clean hot fire completely devoid of smoke and odor in contrast to solid fuels generally utilized for this purpose.

I claim and desire to secure by Letters Patent of the United States the following:—

1. In an alcohol cooker of the class described, a perforated casing having a grilled top plate and a base, a fuel container positioned in said casing upon said base, a combustion element fitting over said fuel container, and a tiltable control valve arranged in said fuel container and capable of controlling the fuel supplied to said combustion element.

2. In an alcohol cooker of the class described, comprising removable elements consisting of an outer perforated casing having a grilled top plate, a tiltable valve controlled fuel container arranged therein, and a perforated and baffled combustion element positioned on said fuel container.

3. In an alcohol cooker of the class described, comprising separable elements consisting of an outer perforated casing having a base and a grilled top plate, a butterfly valve controlled fuel container arranged therein, and a perforated and baffled combustion element positioned on said fuel container and indicated means carried by said fuel container to indicate the position of the control valve.

ALBERT E. LARSEN.